(12) United States Patent
Bhardwaj et al.

(10) Patent No.: US 11,090,688 B2
(45) Date of Patent: Aug. 17, 2021

(54) GAS MATRIX PIEZOELECTRIC ULTRASOUND ARRAY TRANSDUCER

(71) Applicant: The Ultran Group, Inc., State College, PA (US)

(72) Inventors: Anuj M. Bhardwaj, Minneapolis, MN (US); Mahesh C. Bhardwaj, State College, PA (US); Mikel Langron, State College, PA (US); Michael Whetzel, Port Matilda, PA (US)

(73) Assignee: The Ultran Group, Inc.

( * ) Notice: Subject to any disclaimer, the term of this patent is extended or adjusted under 35 U.S.C. 154(b) by 818 days.

(21) Appl. No.: 15/670,332

(22) Filed: Aug. 7, 2017

(65) Prior Publication Data

US 2018/0126418 A1     May 10, 2018

Related U.S. Application Data

(60) Provisional application No. 62/372,847, filed on Aug. 10, 2016.

(51) Int. Cl.
| | |
|---|---|
| *B06B 1/06* | (2006.01) |
| *G01N 29/00* | (2006.01) |
| *G01N 29/26* | (2006.01) |
| *B06B 3/00* | (2006.01) |
| *G01S 7/521* | (2006.01) |

(52) U.S. Cl.
CPC .............. *B06B 1/0622* (2013.01); *B06B 3/00* (2013.01); *G01N 29/00* (2013.01); *G01N 29/262* (2013.01); *B06B 2201/20* (2013.01); *B06B 2201/55* (2013.01); *B06B 2201/76* (2013.01); *G01S 7/521* (2013.01)

(58) Field of Classification Search
CPC ........ B06B 1/06; B06B 1/0607; B06B 1/0622
USPC ................................................. 310/334, 335
See application file for complete search history.

(56) References Cited

U.S. PATENT DOCUMENTS

| | | | |
|---|---|---|---|
| 6,236,144 B1 | 5/2001 | Millar et al. | |
| 6,311,573 B1 | 11/2001 | Bhardwaj | |
| 7,084,552 B2 | 8/2006 | Bhardwaj | |
| 7,382,082 B2 | 6/2008 | Bhardwaj | |
| 7,791,253 B2 | 9/2010 | Bhardwaj | |
| 2003/0127949 A1 | 7/2003 | Nagahara et al. | |
| 2004/0100163 A1* | 5/2004 | Baumgartner | B06B 1/0622 310/334 |
| 2009/0062656 A1 | 3/2009 | Hyuga | |
| 2009/0115291 A1 | 5/2009 | Osawa | |
| 2010/0274136 A1* | 10/2010 | Cerofolini | B06B 1/0622 600/459 |
| 2010/0277038 A1 | 11/2010 | Cerofolini | |
| 2015/0201499 A1 | 7/2015 | Shinar et al. | |
| 2016/0016369 A1 | 1/2016 | Tarbutton et al. | |

OTHER PUBLICATIONS

S.N. Ramadas et al., "Additive manufacture of impedance matching layers for air-coupled ultrasonic transducers", IEEE International Ultrasonics Symposium Proceedings, 2015, 1 pg.

\* cited by examiner

*Primary Examiner* — Derek J Rosenau
(74) *Attorney, Agent, or Firm* — The Webb Law Firm

(57) ABSTRACT

A phased ultrasonic transducer and method for transmitting sound or ultrasound through a gaseous medium into a solid spectrum with ultrasound beam steering and focusing.

2 Claims, 1 Drawing Sheet

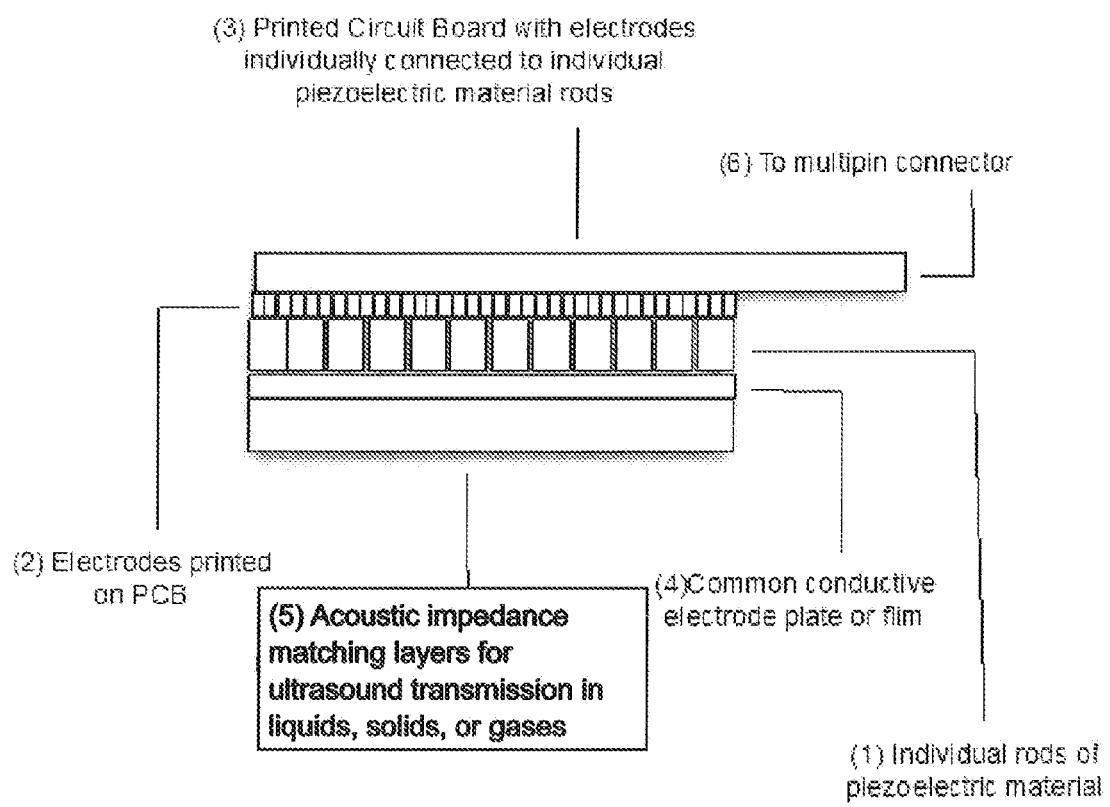

GAS MATRIX PIEZOELECTRIC ULTRASOUND ARRAY TRANSDUCER

BACKGROUND OF THE INVENTION

Field of the Invention

This disclosure is in the field of piezoelectric transducers for ultrasound devices, more particularly, phased ultrasonic piezoelectric transducers.

Description of Related Art

Transducers are devices that transform input signals into output signals of a different form. In ultrasound devices, they transform signals of electric energy into acoustic energy or produce electrical signals from absorbed sound waves. In the fields of non-destructive testing of materials, biomedical, non-invasive diagnostics, and ultrasonic power generation, it is highly desired that the source (transmitter) of ultrasound, that is, the transducer device, be characterized by high transduction in the medium of transmission. It is further desirable that a transducer device be capable of transmitting a phased array in the same way.

Both conventional contact and liquid immersion transducers and techniques are well-known in medical diagnostic procedures and in materials testing. These transducers include both linear and phased. However, such transducers tend to be relatively expensive and generally of larger form factor, conducive to hand-held devices, but not practically adherable to a patient or test material. As such, a number of potentially useful medical therapies or non-destructive testing applications are not easily achievable.

It is thus desirable that a phased transducer exists of low profile and small form factor, such that it could be placed directly onto a patient or a test material for continuous therapy or monitoring. This would avoid the need for trained technicians to administer ultrasound therapy in a clinical setting. For non-destructive testing applications, this could allow for sophisticated and high performance transducers to be placed long-term on aircrafts or other objects for structural health monitoring.

SUMMARY OF THE INVENTION

Briefly, according to this disclosure, there is provided a phased ultrasonic transducer based on the disclosures of U.S. patent application Ser. Nos. 09/446,058, 10/758,782, 10/337,531, and 11/815,363, now U.S. Pat. Nos. 6,311,573, 7,084,552, 7,382,082 and 7,791,253, respectively, the contents of which are incorporated herein by reference.

According to one example of this disclosure is a phased ultrasonic transducer for continuous monitoring that can include a plurality of individual piezoelectric rods, where the individual piezoelectric rods have a top and a bottom and can be separated from one another by a predetermined distance. A printed circuit board can have electrodes printed on the printed circuit board, where the electrodes can be divided into segments such that each segment is connected to an individual piezoelectric rod of the plurality of individual piezoelectric rods and a common conductive electrode plate can be connected to the bottom of the plurality of individual piezoelectric rods. A acoustic impedance matching layer can be bonded to the common conductive electrode plate such that the common conductive electrode plate is between the acoustic impedance matching layer and the plurality of individual piezoelectric rods, and a multipin connector can be connected to an end of the printed circuit board, such that the multipin connector can be connected to an ultrasound excitation and signal amplification electronic system.

In another example, the plurality of individual piezoelectric rods can be separated by nonconductive material. In another example, the combination of an individual piezoelectric rod and a segment of electrodes can be a channel.

In another example, the shape of the individual piezoelectric rods in the core can be square, circular, elliptical, hexagonal, or any other shape. In another example and further relative to their configuration, the individual piezoelectric rods can be orderly or randomly placed in the core.

According to another example of this disclosure is a method for transmitting sound or ultrasound through a gaseous medium into a solid specimen. This method can include using a phased ultrasound transducer for continuous monitoring. In another example, this method can include using a 3D printing method to fabricate a plurality of individual piezoelectric rods, a plurality of electrodes, and a acoustic impedance matching layer. The method can further include that the plurality of individual piezoelectric rods have a top and a bottom and can be separated from one another by a predetermined distance. The electrodes can be printed on a printed circuit board and the electrodes can be divided into segments such that each segment can be connected to an individual piezoelectric rod of the plurality of individual piezoelectric rods. This method can further include that a common conductive electrode plate can be connected to the bottom of the plurality of individual piezoelectric rods, and the acoustic impedance matching layer can be bonded to the common conductive electrode plate such that the common conductive electrode plate can be between the acoustic impedance matching layer and the plurality of individual piezoelectric rods. A multipin connector can be connected to an end of the printed circuit board, and the multipin connector can be connected to an ultrasound excitation and signal amplification electronic system.

BRIEF DESCRIPTION OF THE DRAWING

FIG. 1 is a schematic cross-section of the gas matrix piezoelectric ultrasound array transducer according to this disclosure.

DESCRIPTION OF THE PREFERRED EMBODIMENTS

The cross-section of an example of a gas matrix piezoelectric ultrasound array transducer is illustrated in FIG. 1. The individual rods of piezoelectric materials 1 can be separated from one another by a predetermined distance and have a top and a bottom. The separation of the individual rods of piezoelectric materials 1 can be by a nonconductive material such as epoxy or rubber such as in the Polymer Matrix Piezoelectric (PMP) composite, or can be a solid piezoelectric material that is scribed or etched on one surface in such a manner that all adjacent circles or squares or any other shape of the piezoelectric material is isolated from one another. As further seen in FIG. 1, a printed circuit board (PCB) 3 can have electrodes 2 printed on the PCB 3. The electrodes 2 can be separated into segments such that a segment of electrodes can be connected to individual rods of piezoelectric materials 1. The bottom or far-side of the individual rods of piezoelectric materials 1 of the surfaces of the PMP or the solid piezoelectric material is connected to a common ground electrode plate 4 or thin or thick conductive film.

The electrode plate can be bonded to a acoustic impedance matching layer 5 for suitable transmission in the propagating medium such as water, solid, or even in air, or other gases, such as described in, but not limited to, U.S. Pat. No. 7,382,082.

Still referring to FIG. 1, the PCB or other individually channel-isolating electrode can be connected to a multipin connector 6 or other circuitry, which is connected to a suitable ultrasound excitation and signal amplification electronic system. The system could have control over each individual channel or combination of channels as designated by the PCB (or other channel isolating electrode), to allow for phased steering and focusing, or active control of channels to be excited or inactivated as desired.

Through control of each piezoelectric rod (channel), the device can exhibit ultrasound beam steering and focusing.

The invention claimed is:

1. A phased ultrasonic transducer for continuous monitoring comprising:
   a plurality of individual piezoelectric rods, wherein the individual piezoelectric rods have a top and a bottom and are separated from one another by a predetermined distance;
   a printed circuit board having electrodes printed on the printed circuit board, wherein the electrodes are divided into segments such that each segment comprises a plurality of electrodes connected to an individual piezoelectric rod of the plurality of individual piezoelectric rods, and wherein each combination of a piezoelectric rod with a segment of electrodes is an individual channel;
   a common conductive electrode plate connected to the bottom of the plurality of individual piezoelectric rods;
   an acoustic impedance matching layer is bonded to the common conductive electrode plate such that the common conductive electrode plate is between the acoustic impedance matching layer and the plurality of individual piezoelectric rods; and
   a multipin connector is connected to an end of the printed circuit board, wherein the multipin connector is connected to an ultrasound excitation and signal amplification electronic system.

2. The phased ultrasonic transducer of claim 1, wherein the plurality of individual piezoelectric rods are separated by nonconductive material.

* * * * *